Aug. 26, 1930.                E. E. DEAL                1,774,424
                                SPRING
                           Filed July 29, 1927
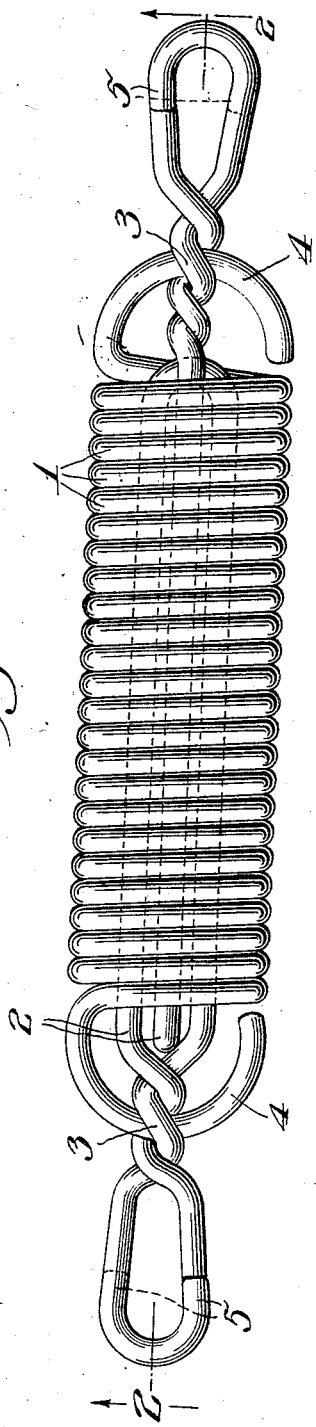
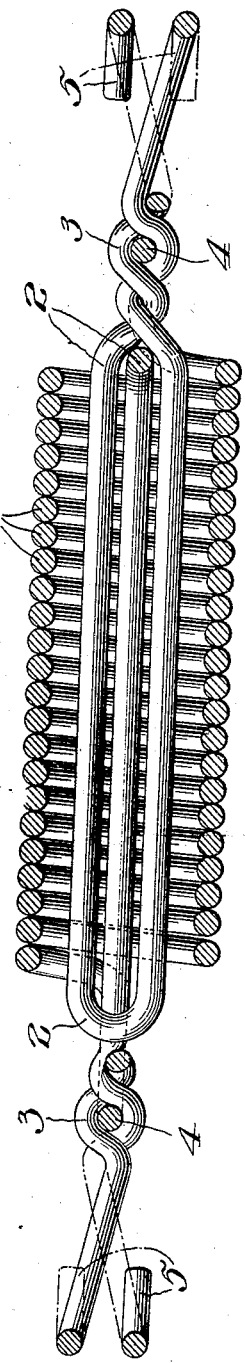
Edmond E. Deal INVENTOR Patented Aug. 26, 1930

1,774,424

UNITED STATES PATENT OFFICE

EDMOND E. DEAL, OF ASHLEY, PENNSYLVANIA

SPRING

Application filed July 29, 1927. Serial No. 209,359.

The present invention relates to spring devices and more especially to an improved safety spring adapted for supporting porch swings or used in connection with tow ropes or lines and for similar purposes, and it has for its purpose to insure safety in case the spring should break.

Another purpose is to provide a spring having improvements over the spring set forth, claimed and illustrated in the United States Letters Patent of August 31st, 1926, Patent No. 1,598,489, to the extent of dispensing with the case shown in said patent and at the same time connecting the opposite ends of the spring to the twists at the remote ends of the links, which are surrounded by convolutions of the spring, thereby simplifying the structure and at the same time rendering the manufacture of the spring less expensive and enabling it to be sold more reasonably.

It is to be understood that the particulars herein given are in no way limitive. and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a view in elevation of the improved spring constructed in accordance with the invention, showing the links in dotted lines.

Figure 2 is a sectional view through the spring, showing the links in full lines, but showing the hooks at the remote ends of the links in different positions than is shown in Figure 1.

Referring to the drawings, 1 identifies the spring, the opposite ends of which terminate in semi-circular hooks. Located within the spring are links 2, which are inter-locked and capable of sliding movement relative to each other, when the spring is stretched or put under tension. The links are in the form of elongated loops, the purpose being to insure safety in case the spring should break when it is put under severe strain. In other words the links being in the form of loops and interlocked as shown, prevent entire separation of opposite parts of a tow rope (not shown), which may be connected to the remote ends of the links.

The two sides of the links at their remote end portions are twisted together at 3 and engaged through the twists are the hooks 4 which are formed at the opposite ends of the spring, so that when the links are pulled in opposite directions from each other the spring may be put under tension or stretched.

Beyond the twists 3 the sides of the links terminate in hooks 5 which are reversely disposed and are separated as shown so as to permit them to engage with the ring or to whatever the two ends of a tow line may connect, so as to put the spring under tension, when power is applied to the tow line, or when the spring is used for supporting a porch swing.

The invention having been set forth what is claimed is:

In a device as set forth, a coil tensioned spring with its convolutions closely wound and contacting, a pair of elongated loop links, one interlocked longitudinally with the other and housed within the tightly wound spring, the sides of the links at their remote end portions being twisted together and terminating in reversely disposed hooks beyond the twists, a portion of each twist being open, the opposite ends of the coil spring terminating in hooks which are aligned with each other and engaged through the open portions of both twists, whereby the spring may give if it is put under tension.

In testimony whereof he affixes his signature.

EDMOND E. DEAL.